(12) United States Patent
Mayer-Rosa et al.

(10) Patent No.: US 9,627,801 B2
(45) Date of Patent: Apr. 18, 2017

(54) INSERT MOLDED CABLE FOR USE IN A WELDING DEVICE

(71) Applicant: Balluff GmbH, Neuhausen a.d.F. (DE)

(72) Inventors: Michael Mayer-Rosa, Neuhausen (DE);
Thomas Bayer, Neuhausen a.d.F. (DE);
Andreas Kammerer, Winnenden (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 15/073,780

(22) Filed: Mar. 18, 2016

(65) Prior Publication Data
US 2016/0322742 A1    Nov. 3, 2016

(30) Foreign Application Priority Data

Apr. 29, 2015    (DE) .................... 20 2015 102 167 U

(51) Int. Cl.
*H01R 13/58* (2006.01)
*H01R 13/717* (2006.01)
(Continued)

(52) U.S. Cl.
CPC .......... *H01R 13/5845* (2013.01); *B23K 9/32* (2013.01); *H01B 3/30* (2013.01); *H01B 7/02* (2013.01);
(Continued)

(58) Field of Classification Search
CPC ... H01B 3/08; H01B 3/30; H01B 3/02; H01B 7/29; H01B 7/292; H01B 7/295; H01R 13/5845; H01R 13/7175; H01R 9/11
See application file for complete search history.

(56) References Cited

U.S. PATENT DOCUMENTS 3,823,255 A * 7/1974 La Gase .............. H01B 7/295
174/113 R
4,150,249 A * 4/1979 Pedersen .............. H01B 7/295
174/103
(Continued)

OTHER PUBLICATIONS

IEC 60332-2-2, Tests on electric and optical fibre cables under fire conditions—Part 2-2: Test for vertical flame propagation for a single small insulated wire or cable—Procedure for diffusion flame, First Edition, Jul. 2004, total of 36 pages.
(Continued)

*Primary Examiner* — Hoa C Nguyen
*Assistant Examiner* — Amol Patel
(74) *Attorney, Agent, or Firm* — Collard & Roe, P.C.

(57) ABSTRACT

An electric cable includes a current line having first and second ends, including several individually insulated wires, a first and at least one second plug connector on the first and second ends, respectively. A mutual coating surrounded by a perfluorocarbon and/or glass fiber outer casino surrounds all wire insulations. Each plug connector is insert molded with the outer casing. At least one plug connector includes a material having A) 98.0-99.8 weight % of a polymer selected from the group consisting of polyurethane (PU), styrene-butadiene block copolymers (SBS), perfluorocarbons and mixtures thereof, and B) 0.2-2.0 weight % additives, with A and B totaling 100 weight %. A first and at least one second connection nut are arranged on the first and second plug connectors, respectively. A light source configured to be supplied with electrical energy by at least one wire is arranged in a first and/or second plug connector.

13 Claims, 2 Drawing Sheets

(51) Int. Cl.
| | |
|---|---|
| *H01B 7/02* | (2006.01) |
| *B23K 9/32* | (2006.01) |
| *H01B 3/30* | (2006.01) |
| *H01B 7/28* | (2006.01) |
| *H01R 9/11* | (2006.01) |
| *H01B 7/29* | (2006.01) |

(52) U.S. Cl.
CPC ............... *H01B 7/28* (2013.01); *H01B 7/29* (2013.01); *H01R 9/11* (2013.01); *H01R 13/7175* (2013.01)

(56) References Cited

U.S. PATENT DOCUMENTS

| | | | | |
|---|---|---|---|---|
| 4,547,626 | A * | 10/1985 | Pedersen | G02B 6/4416 174/107 |
| 4,659,871 | A | 4/1987 | Smith et al. | |
| 6,577,243 | B1 * | 6/2003 | Dannenmann | H01R 13/641 324/66 |
| 7,049,937 | B1 * | 5/2006 | Zweig | H01R 13/641 324/66 |
| 7,211,766 | B2 * | 5/2007 | Rehrig | B23K 9/323 174/15.6 |
| 7,247,797 | B2 * | 7/2007 | Buthe | H01B 7/295 174/110 R |
| 7,378,595 | B2 * | 5/2008 | Brambilla | H01B 3/04 174/113 R |
| 7,511,245 | B2 * | 3/2009 | Hsu | B23K 9/201 219/98 |
| 8,937,251 | B2 | 1/2015 | Mayer-Rosa et al. | |
| 8,937,252 | B2 | 1/2015 | Mayer-Rosa et al. | |
| 2007/0087637 | A1 | 4/2007 | Zart et al. | |
| 2009/0056974 | A1 | 3/2009 | Groegl et al. | |
| 2013/0206463 | A1 * | 8/2013 | Boday | C07F 9/4012 174/258 |

OTHER PUBLICATIONS

DIN ISO 7619-1, Rubber, vulcanized or thermoplastic—Determination of indentation hardness—Part 1: Durometer method (Shore hardness) (ISO 7619-1:2010), Feb. 2012, total of 17 pages.

DIN ISO 7619-2, Rubber, vulcanized or thermoplastic—Determination of indentation hardness—Part 2: IRHD pocket meter method (ISO 7619-2:2010), Feb. 2012, total of 10 pages.

English translation of DIN EN 13602, Copper and copper alloys—Drawn, round copper wire for the manufacture of electrical conductors, Sep. 2013, total of 24 pages.

CEI IEC 60529, Degrees of protection provided by enclosures (IP Code), Edition 2.1, Feb. 2001, total of 102 pages, with Correction 1 dated Jan. 2003 and Correction 2 dated Oct. 2007.

ISO 868, Plastics and ebonite—Determination of indentation hardness by means of a durometer (Shore hardness), Mar. 1, 2003, total of 12 pages.

English translation of DIN 53504, Testing of rubber—Determination of tensile strength at break, tensile stress at yield, elongation at break and stress values in a tensile test, Oct. 2009, total of 18 pages.

DIN ISO 34-1, Rubber, vulcanized or thermoplastic—Determination of tear strength, Part 1: Trouser, angle and arescent test pieces, Jul. 2004, total of 14 pages. (and also DIN ISO 34-1, Jul. 2005, Correction to DIN ISO 34-1:2004-07, 2 pages).

English translation of DIN ISO 4649, Rubber, vulcanized or thermoplastic—Determination of abrasion resistance using a rotating cylindrical drum device, Nov. 2006, total of 20 pages.

ISO 7619-1, Rubber, vulcanized or thermoplastic—Determination of indentation hardness—Part 1: Durometer method (Shore hardness), Second edition, Oct. 1, 2010, total of 20 pages.

English translation of DIN EN ISO 179-1, Plastics—Determination of Charpy impact properties—Part 1: Non-Instrumented impact test, Nov. 2010, total of 29 pages.

\* cited by examiner

INSERT MOLDED CABLE FOR USE IN A WELDING DEVICE

CROSS REFERENCE TO RELATED APPLICATIONS

Applicant claims priority under 35 U.S.C. §119 of German Application No 20 2015 102 167.4 filed Apr. 29, 2015, the disclosure of which is incorporated by reference.

BACKGROUND OF THE INVENTION

Field of the Invention

The present invention relates to an electric cable. Furthermore, the invention relates to the use of the electric cable as a control line for a welding device, in particular in the automotive industry.

Prior Art

Welding devices, in particular welding robots for automated industrial applications, require for their control electric cables which can withstand high stresses. It is required that such electric cables are flame-retardant according to different standards such as IEC 60332-2, VDE 0482-265-2-2 and EN 50265-2-2. Furthermore, they must be able to be withstand contact with welding beads, i.e. metal which melts and sprays during welding, over a long period of time For the functional control of electric cables, control lights, such as, for example LEDs, can be provided on these. However, this control possibility has not existed for electric cables for welding devices until now. Even electric cables known today without control lights, which are used in welding devices, must be replaced regularly, as an exposure of cable wires occurs very often due to the rough conditions during welding. Conventional electric cables with control lights could not withstand these conditions even in the short term. It is therefore the object of the present invention to provide an electric cable which has a particularly high resistance to welding conditions and which can be used as a control line for a welding device, and which has at least one control light.

SUMMARY OF THE INVENTION

This object is solved by the electric cable according to the invention. This comprises at least one current brie having a first end and a second end, comprising several wires, a first plug connector which is arranged on the first end of the current line and at least one second plug connector which is arranged on the second end of the current line. Each wire has a wire insulation. All wire insulations are surrounded by a mutual coating and the coating is surrounded by an outer casing. The outer casing contains a perfluorocarbon and/or glass fibres. The plug connectors are each completely insert molded with the outer casing. At least one plug connector consists of a material which has, as component A, 98.0% by weight to 99.8% by weight of a polymer which is selected from the group consisting of polyurethane (PU), styrene butadiene block copolymers (SBS), perfluorocarbons and mixtures thereof, and which has as component B, 0.2% by weight to 2.0% by weight additives. The total of components A and B results in 100% by weight. The electric cable furthermore has a first connection nut which is arranged on the first plug connector and it has at least one second connection nut, which is arranged on a second plug connector. At least one light source is arranged in a first plug connector and/or in a second plug connector which consists of the material with components A and B. Each light source is configured in order to be supplied with electrical energy by means of at least one wire of the current line.

The arrangement according to the invention of the light source in a plug connector protects this from the conditions of a welding insert. The material of the plug connector thereby enables, on the one hand, an extraordinarily high resistance of the electric cable to the conditions of the welding insert. Therefore, it is in particular suitable for use as a control line for a welding device. On the other hand, this material, however, is also sufficiently translucent in order to enable a light emission of the light source through the plug connector. The material of the outer casing also has a high resistance to the conditions of a welding insert and a sufficient translucency.

The additives B were added to polymer A preferably as a master batch which contains no flame retardants. An opaquing effect of the flame retardant is hereby prevented. A sufficient flame resistance of the plug connector in order to withstand the conditions of a welding insert is already ensured by the inherent material properties of polymer A.

The material of the plug connector and of the outer casing is preferably not only translucent, but transparent. This enables a particularly good transmission of the light emitted by the light source through the plug connector.

An LED is preferred as a light source, as this has a high heat tolerance and emits only little heat itself. This is important as the material of the plug connector prevents the discharging of the heat.

The current line comprises at least two wires and preferably four wires. Therefore, it can be connected as a pole-rectified cable in which the magnetic fields of the four wires are partially compensated for. The wires consist, in particular of Cu-ETP1 according to DIN EN 13602. They can, in addition to a function as control wires, supply the at least one light source with electrical energy.

The wire insulations preferably comprise a material which is selected from the group consisting of polyalkylenes, polyvinyl chloride and mixtures thereof. The coating preferably comprises a material which is selected from the group consisting of polyurethane, polyvinyl chloride, thermoplastic polyester elastomers, thermoplastic copolyesters and mixtures thereof. The following combinations of wire insulation material and coating material are particularly preferred: Wire insulation and coating made from polyvinyl chloride; wire insulation made from polyvinyl chloride and coating made from thermoplastic polyester elastomer; wire insulation made from polypropylene and coating made from polyurethane.

Optionally, an electrical shield can be arranged between the wire insulations and the coating. This preferably consists of metal fibres, particular preferably of nickel fibres.

The complete insert molding of the coating by the outer casing seals the transition between the current conductor and the plug connectors, in particular such that the electric cable according to the invention satisfies protection class IP67 according to the standard DIN EN 60529.

The glass fibres of the outer coating preferably consist of E-glass yarn (CAS no. 65997-17-3).

The outer casing preferably contains no flame retardants. An opaquing effect of the flame retardant in the region of the plug connector is hereby prevented. A sufficient flame resistance of the outer casing in order to withstand the conditions of a welding insert is already ensured by the inherent material properties of the outer casing.

The connection nuts each preferably comprise a perfluorocarbon.

Perfluorocarbons are understood according to the invention in particular as perfluoroalkanes, perfluorocoalkylenes, perfluoroalkoxy polymers and copolymers of methacrylates and perfluoroalkyl acrylates. Polytetrafluoroethylene (PTFE), perfluoroethylene propylene (FEP) and mixtures thereof are preferred.

The plug connectors preferably comprise a polyurethane which is based on a polyester, a polyether or a polyester ether as a polyol. Among these, a polyether is particularly preferred. Furthermore, it is preferred that the plug connectors each consist of a material that has a hardness of at least Shore 50D according to the standards DIN 53505 and ISO 868. The tensile strength of the material preferably amounts to at least 45 MPa according to DIN 53504. Its elongation at break preferably amounts to at least 425% according to DIN 53504. Its tear resistance preferably amounts to at least 140 N/mm according to DIN ISO 34-1Bb, Its abrasion preferably amounts to a maximum of 35 mm$^3$ according to DIN ISO 4649-A.

BRIEF DESCRIPTION OF THE DRAWINGS

Exemplary embodiments of the invention are illustrated in the drawings and are explained in more detail in the subsequent description.

EXEMPLARY EMBODIMENTS OF THE INVENTION

Figure 1:
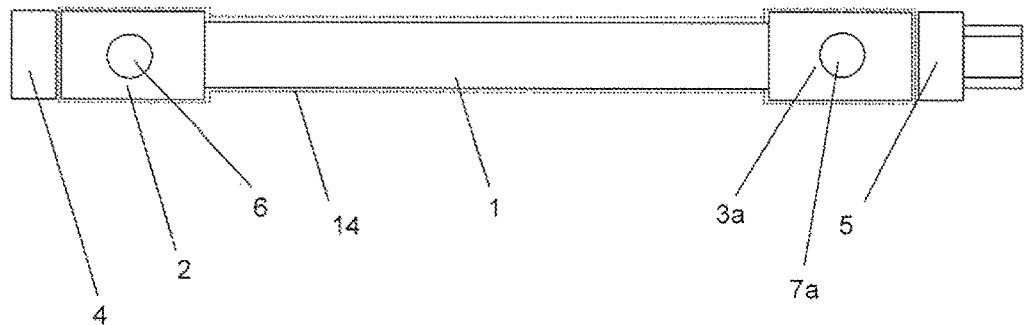
FIG. 1 shows a side view of an electric cable according to one embodiment of the invention.
Figure 2:
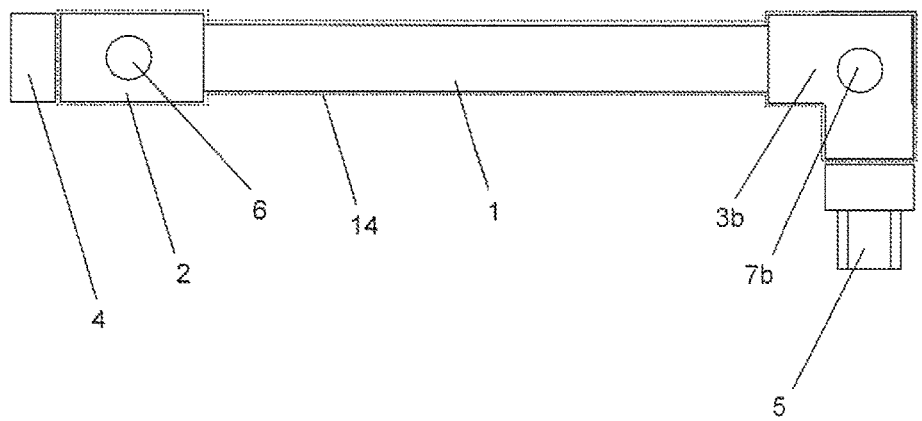
FIG. 2 shows a side view of an electric cable according to another embodiment of the invention.
Figure 3:
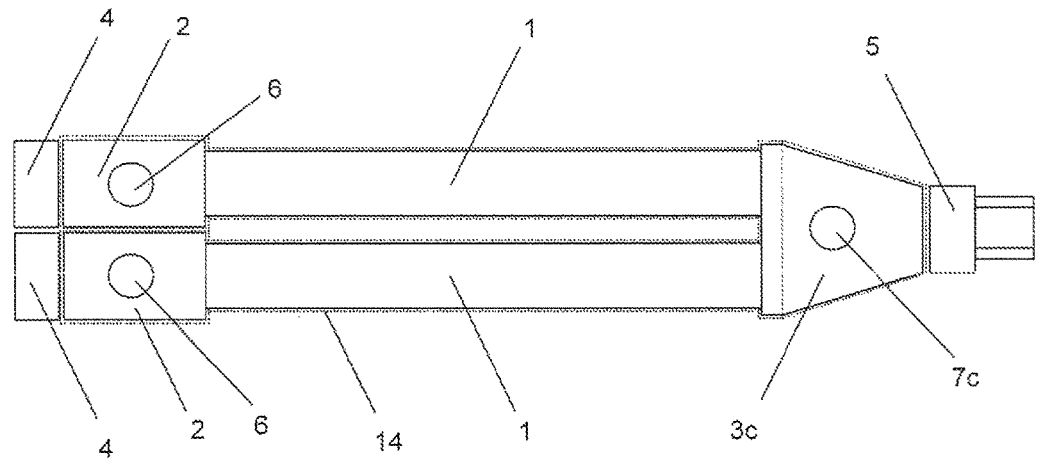
FIG. 3 shows a side view of an electric cable according to yet another embodiment of the invention.
Figure 4:
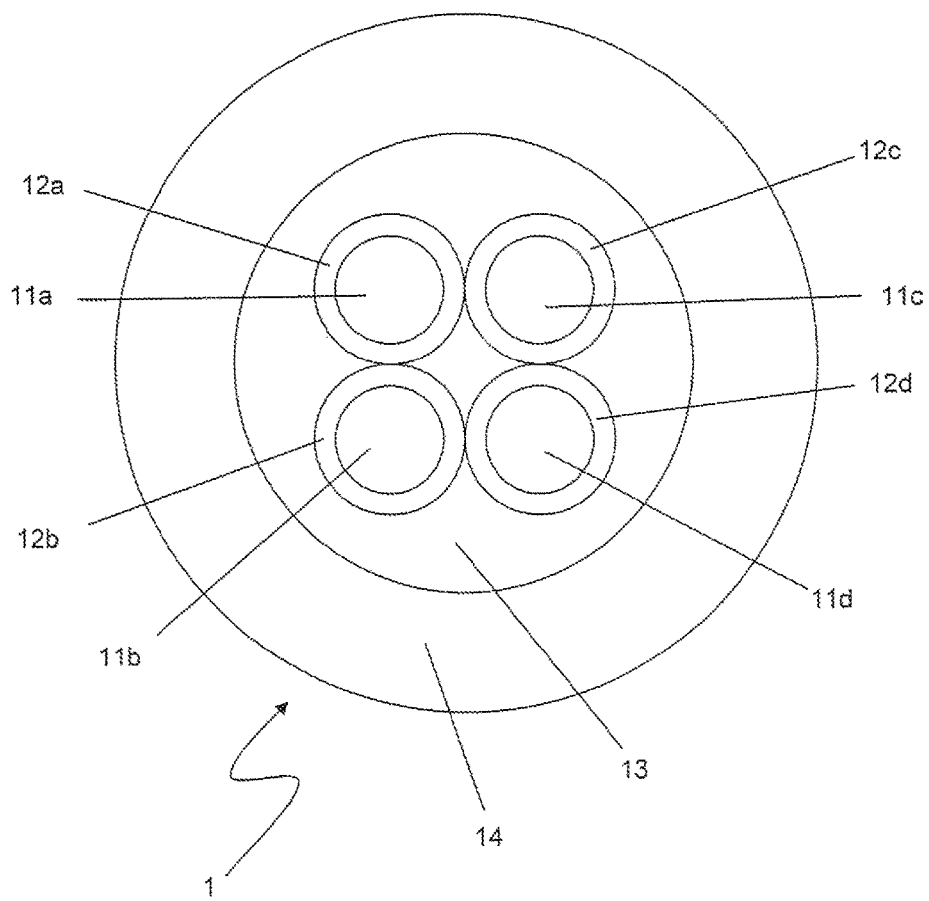
FIG. 4 shows a longitudinal cut through the current line of an electric cable according to one embodiment of the invention.

The resistance of cables to welding conditions was investigated in comparative examples (VB1 to VB7) and examples according to the invention (B1 and B2) of electric cables. The structure of such an electric cable is shown in three embodiments in FIGS. 1, 2 and 3. FIG. 4 shows a longitudinal cut through the current line 1 of this electric cable. The current line 1 comprises four wires 11a, 11b, 11c, 11d. Each wire, 11a, 11b, 11c, 11d has a wire insulation 12a, 12b, 12c, 12d. All wire insulations 12a, 12b, 12c, 12d are surrounded by a mutual coating 13. The coating is completely insert molded with an outer casing 14. A first plug connector 2 is arranged on the first end of the current line 1. A second plug connector 3a, 3b, 3c is arranged on the second end of the current line. The second plug connector can be embodied as a linear plug connector 3a, as an angled plug connector 3b or as a Y-plug connector 3c. The plug connectors 2, 3a, 3b, 3c are also insert molded with the outer casing 14. The plug connectors 2, 3a, 3b, 3c are each crimped onto the current line 1. A first connection nut 4 is arranged on the first plug connector 2. A second connection nut 5 is arranged on the second plug connector 3a, 3b, 3c. An LED is arranged as a light source 6, 7a, 7b, 7c in each plug connector. This is molded into the material of the plug connector and is supplied with electrical energy by means of the wires 11a, 11b, 11c, 11d.

The wires 11a, 11b, 11c, 11d consisted in all examples of Cu-ETP1 and each had a cross-sectional area of 0.34 mm$^2$. The materials M12 of the wire insulations 12a, 12b, 12c, 12d, the materials M13 of the coatings 13, the materials M14 of the outer casings 14, the materials M2/3 of the plug connectors 2, 3a, 3b, 3c and the materials M4/5 of the connection nuts 4, 5 are listed in Table 1:

TABLE 1

| # | M12 | M13 | M14 | M2/3 | M4/5 | resistant |
|---|---|---|---|---|---|---|
| VB1 | PVC | PVC | FEP* | 99% PU + 1% master batch | PTFE | no |
| VB2 | PVC | PVC | glass* | 99% PU + 1% master batch | PTFE | no |
| VB3 | PVC | PVC | aramid* | 99% PU + 1% master batch | PTFE | no |
| VB4 | PVC | PVC | PET* | 99% PU + 1% master batch | PTFE | no |
| VB5 | PVC | PVC | silicone | PVC | PTFE | no |
| VB6 | PVC | PVC | silicone | 99% PU + 1% master batch | steel | no |
| B1 | PVC | PVC | FEP | 99% PU + 1% master batch | PTFE | yes |
| B2 | PVC | TPEE | FEP | 99% PU + 1% master batch | PTFE | yes |
| B3 | PP | PU | FEP | 99% PU + 1% master batch | PTFE | yes |
| B4 | PP | PU | glass# | 99% PU + 1% master batch | PTFE | yes |

Here, PVC stands for polyvinyl chloride, PP for polypropylene, PU for polyurethane, FEP for perfluoroethylene propylene, TPE-E for a thermoplastic polyester elastomer, glass for E-glass fibre yarn and aramid for para-aramid, All materials M14 which are marked with an * were slid over the coating 13 as a tube (VB1 VB4). In the example in which the material M14 is marked with a #, the coating 13 was enveloped with the outer casing 14 and the plug connectors 2, 3a, 3b, 3c were completely insert molded with the material M14 of the outer casing 14 (B4). In all examples in which the materials M14 are not marked with an * or a #, the outer casing 14 was slid over the coating 13 as a tube and the plug connectors 2, 3a, 3b, 3c were completely insert molded with the respective material M14 of the outer casing 14 (VB5-VB6, B1-B3).

PVC Y17 (Shore hardness 90-95A) was used as a PVC for the wire insulation. PVC YM3 (Shore hardness AB0-65) was used as a PVC for the coating. PP9Y (Shore hardness 54D) was used as a polypropylene. TPU 11YH1 (Shore hardness 54D) was used as a PU for the coating. All combinations of wire 11a, 11b, 11c, 11d, wire insulation 12a, 12b, 12c, 12d and coating 13 were provided by Franz Binder GmbH+Co. Elektrische Bauelemente KG Neckarsulm, Germany, as manufactured current lines. WIGAFLEX SV 13 of Garnisch GmbH, Memmingen, Germany was used as E-glass fibre yarn. Kevlar® of the company E. I. du Pont de Nemours, Wilmington. USA was used as a para-aramid. Teflon® of the company E.I du Pont de Nemours, Wilmington, USA was used as an FEP. Transparent Elastollan 1154D (Shore hardness 530, tensile strength 50 MPa, elongation at break 450%, tear resistance 150 N/mm, abrasion 30 mm$^3$) of the company BASF, Ludwigshafen, Germany was used as a PU for the plug connectors 2, 3a, 3b, 3c. A flame retardant free coloured granulate was used as a master batch. The percent specifications each refer to 100 percent by weight of the total material of the polyurethane and master batch.

All investigated cables were used as a control line in an intrinsically known welding device in 62,200 consecutive welding cycles. Only the electric cables according to the invention of examples B1 and B2 withstood these experimental conditions without at least one of the wires thereby being exposed. Consequently, these have a particularly high resistance to welding conditions.

What is claimed is:

1. Electric cable, comprising
   at least one current line (1) having a first end and a second end, comprising several wires (11*a*, 11*b*, 11*c*, 11*d*), wherein each wire (11*a*, 11*b*, 11*c*, 11*d*) has a wire insulation (12*a*, 12*b*, 12*c*, 12*d*), all wire insulations are surrounded by a mutual coating (13), and the coating is surrounded by an outer casing (14), wherein the outer casing (14) contains a perfluorocarbon and/or glass fibres,
   a first plug connector (2) which is arranged on the first end of the current line (1), and at least one second plug connector (3*a*, 3*b*, 3*c*) which is arranged on the second end of the current line, wherein the plug connectors (2, 3*a*, 3*b*) are each completely insert molded with the outer casing (14) and wherein at least one plug connector (2, 3*a*, 3*b*, 3*c*) consists of a material having
   A) 98.0% by weight to 99.8% by weight of a polymer which is selected from the group consisting of polyurethanes, styrene butadiene block copolymers, perfluorocarbons and mixtures thereof, and
   B) 0.2% by weight to 2.0% by weight additives, wherein the total of components A and B results in 100% by weight,
   a first connection nut (4) which is arranged on the first plug connector (2), and at least one second connection nut (5) which is arranged: on a second plug connector (3*a*, 3*b*, 3*c*), and
   at least one light source (6) which is arranged in the first plug connector (2) and/or at least one light source (7*a*, 7*b*, 7*c*) which is arranged in the second plug connector (3*a*, 3*b*), wherein the light source (6, 7*a*, 7*b*, 7*c*) is configured in order to be supplied with electrical energy by means of at least one wire (11*a*, 11*b*, 11*c*, 11*d*) of the current line (1).

2. Electric cable according to claim 1, wherein the additives were added to polymer A as a master batch which contains no flame retardants.

3. Electric cable according to claim 1, wherein the material of the plug connector (2, 3*a*, 3*b*, 3*c*) is transparent.

4. Electric cable according to claim 1, wherein the light source (6, 7*a*, 7*b*, 7*c*) is an LED.

5. Electric cable according to claim 1, wherein the wire insulations (12*a*, 12*b*, 12*c*, 12*d*) comprise a material which is selected from the group consisting of polyalkylenes, polyvinyl chloride and mixtures thereof.

6. Electric cable according to claim 1, wherein the coating (13) comprises a material which is selected from the group consisting of polyurethane, polyvinyl chloride, thermoplastic polyester elastomers, thermoplastic copolyesters and mixtures thereof.

7. Electric cable according to claim 1, wherein connection nuts (4, 5) each comprise a perfluorocarbon.

8. Electric cable according to claim 1, wherein the perfluorocarbon is selected from the group consisting of polytetrafluoroethylene, perfluoroethylene propylene and mixtures thereof.

9. Electric cable according to claim 1, wherein the polyurethane is based on a polyester, a polyether or a polyester ether.

10. Electric cable according to claim 1, wherein the plug connectors (2, 3*a*, 3*b*) each comprise a material that has a hardness of at least Shore 50D.

11. Electric cable according to claim 1, wherein the current line (1) comprises four wires (11*a*, 11*b*, 11*c*, 11*d*).

12. Electric cable according to claim 1, wherein the wires (11*a*, 11*b*, 11*c*, 11*d*) each comprise Cu-ETP1.

13. Use of an electric cable according to claim 1 as a control line for a welding device.

* * * * *